(12) United States Patent
McLeod et al.

(10) Patent No.: US 6,914,113 B2
(45) Date of Patent: Jul. 5, 2005

(54) FILM CLARITY AND RHEOLOGICAL BREADTH IN POLYETHYLENE RESINS

(75) Inventors: Michael McLeod, Kemah, TX (US); Gerhard Guenther, Seabrook, TX (US); Nguong van Nguyen, Pas, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 10/205,412

(22) Filed: Jul. 25, 2002

(65) Prior Publication Data

US 2004/0019155 A1 Jan. 29, 2004

(51) Int. Cl.$^7$ .......................... C08F 110/02; C08F 8/06
(52) U.S. Cl. .................... 526/352; 526/937; 525/333.8; 525/340; 525/387
(58) Field of Search ................ 526/352, 937; 525/333.8, 340, 387

(56) References Cited

U.S. PATENT DOCUMENTS 5,486,575 A * 1/1996 Shroff ..................... 525/333.8
6,329,465 B1 * 12/2001 Takahashi et al. .......... 525/191

OTHER PUBLICATIONS

A.M. Sukhadia, D.C. Rohlfing, G.L. Wilkes and M.B.Johnson, Optical Properties of Polyethylene Blown Films, Part 2., SPE ANTEC Conference, pp. 1–8, May 6–10, 2001, Dallas, TX.

* cited by examiner

Primary Examiner—Robert D. Harlan
(74) Attorney, Agent, or Firm—Madan, Mossman & Sriram, P.C.

(57) ABSTRACT

A method of modifying a polyethylene material is accomplished by providing a polyethylene resin. The initial rheological breadth of the polyethylene resin is determined. The resin is then modified to adjust the rheological breadth of the polyethylene from the initial rheological breadth to a different rheological breadth that corresponds to a desired resin property, such as haze. A method for predicting clarity and rheological breadth properties is also provided, which utilizes a template of measured properties for polyethylene resins.

18 Claims, 1 Drawing Sheet

FILM CLARITY AND RHEOLOGICAL BREADTH IN POLYETHYLENE RESINS

TECHNICAL FIELD

The invention relates generally to polyolefins, and in particular to ethylene polymers.

BACKGROUND

Polyethylene is a polymer chain formed from the polymerization of ethylene monomers. In its simplest form, polyethylene can be represented by the following general formula:

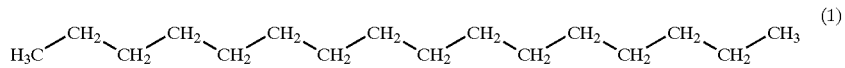

(1)

As shown, the polyethylene constitutes a linear polyethylene because it has little to no polymer side chains that offshoot from the main polymer chain. Polyethylene with this structure is called high density polyethylene (HDPE). During polymerization of polyethylene, however, branching can occur where other polyethylene side chains are formed and branch off from the main polymer chain to form a branched polymer molecule. Typically, short chain branches (usually three to ten carbons long) are formed by adding an alpha-olefin comonomer. Adding short chain branches lowers the density by disrupting the crystallization process. In large enough quantities (densities lower than 0.940 g/cc) this forms a class of polyethylene called linear low density polyethylene (LLDPE). The third general class of polyethylene is low density polyethylene (LDPE). It is produced by a high-temperature and high pressure, radical-initiated polymerization process which forms a highly branched polymer with approximately 60 branch points per 1000 carbon atoms.

Polyethylene is used in manufacturing a variety of different products. Among these include films or sheet-like materials used for product packaging, merchandise bags, trash and can liners, medical packaging, stretch and shrink wrap, and the like. One common method of forming polyethylene films is through a blown film process. In this process, molten polyethylene is extruded through an annular die to form a vertical column or sleeve. Air is blown through the center of the sleeve to expand the film. Air may also be blown along the exterior of the sleeve to facilitate cooling of the polyethylene. The sleeve is then collapsed and collected on rollers.

In many polyethylene blown film processes, the polyethylene film has a somewhat opaque or hazy appearance. For many applications, this is often a desirable property of the film. The haze or clarity of the film and its causes are the subject of much study. It is believed that both surface properties of the film, as well as bulk properties of the resin, contribute to this hazy appearance. There are many theories, however, as to the physics and mechanics that contribute to this phenomenon.

BRIEF DESCRIPTION OF THE DRAWINGS

For a more complete understanding of the present invention, and the advantages thereof, reference is now made to the following descriptions taken in conjunction with the accompanying figures, in which.

DETAILED DESCRIPTION

Figure 1:
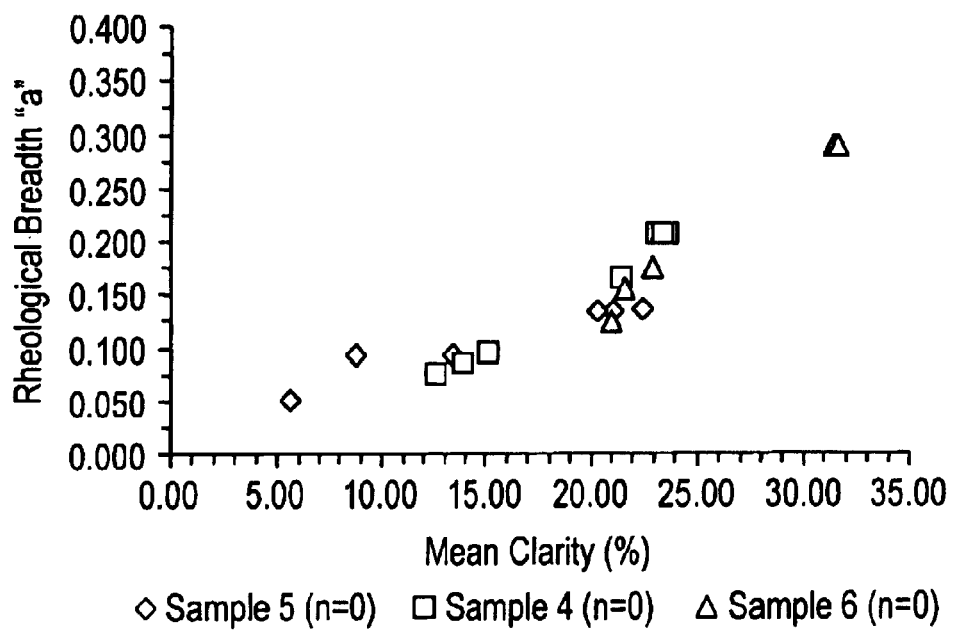
FIG. 1 is a plot showing the relationship of rheological breadth versus film clarity for polyethylene resin Samples 4–6.

It has been found that by changing the rheological breadth of polyethylene resins, certain effects in the polymer properties can be achieved. Specifically, changes in clarity or haze of polyethylene films, particularly blown films, can be made and predicted based upon the rheological breadth of the polyethylene polymer.

Rheological breadth refers to the breadth of the transition region between Newtonian and power-law type shear rate or frequency dependence of the viscosity. The rheological breadth is a function of the relaxation time distribution of the resin, which in turn is a function of the resin's molecular structure or architecture. It is experimentally determined, assuming Cox-Merz rule, by fitting flow curves generated using linear-viscoelastic dynamic oscillatory frequency sweep experiments with a modified Carreau-Yasuda (CY) model, represented as follows:

$$\eta = \eta_o [1 + (\lambda \dot{\gamma})^a]^{\frac{n-1}{a}} \quad (2)$$

where
$\eta$ = viscosity (Pa s)
$\dot{\gamma}$ = shear rate (1/s)
a = rheological breadth parameter [CY model parameter which describes the breadth of the transition region between Newtonian and power law behavior]
$\lambda$ = relaxation time sec [CY model parameter which describes the location in time of the transition region]
$\eta_o$ = zero shear viscosity (Pa s) [CY model parameter which defines the Newtonian plateau]
n = power law constant [CY model parameter which defines the final slope of the high shear rate region]

To facilitate model fitting, the power law constant (n) is held to a constant value (n=0 or 0.2) for all samples. In all examples presented herein, n was set equal to zero.

For resins with no differences in levels of long chain branching (LCB), it has been observed that the rheological breadth parameter "a" is inversely proportional to the breadth of the molecular weight distribution (MWD). Similarly, for samples that have no differences in the molecular weight distribution, the breadth parameter "a" has been found to be inversely proportional to the level of long chain branching. An increase in the rheological breadth of a resin is therefore seen as a decrease in the breadth parameter "a" value for that resin. This correlation is a consequence of the changes in the relaxation time distribution accompanying those changes in molecular architecture.

The level of long chain branching is quantified in terms of the resins flow activation energy ($E_a$). The time dependent shifts (e.g., horizontal shift of modulus or stress versus frequency) required to form a mastercurve from the flow curves at 170° C., 200° C. and 230° C. are used to calculate the flow activation energy using the temperature dependence of the linear viscoelastic properties in the form of the Arrhenius equation, $$\alpha_T = \exp(\frac{E_a}{R}\left(\frac{1}{273+T} - \frac{1}{273+T_o}\right)) \quad (3)$$

where
$E_a$=flow activation energy (kcal/mol)
T=temperature of the data being shifted
$T_o$=reference temperature
R=gas constant
$\alpha_T$=shift factor required to superimpose the flow curves at each temperature to the reference temperature ($T_o$).

The flow activation energy is solved using the values of the shift factor required to overlap the flow curve at temperature (T) to that of the flow curve at temperature ($T_o$).

The flow activation energy ($E_a$) represents the activation energy barrier associated with the energy required to create a hole big enough for a molecule to translate into during flow. This general definition of ($E_a$) suggests its relationship or sensitivity to changes in molecular architecture such as those associated with changes in levels or types of long chain branching.

The invention has application to practically all polyethylene resins. Polyethylene resins prepared from Ziegler-Natta, chromium, metallocene or late-transition metal catalyst systems, which are known to those skilled in the art, may be used. Additionally, regrind or post consumer recycle polyethylene may be used. Unless specified otherwise, the term "polyethylene" shall include polyethylene homopolymers and copolymers of ethylene and other olefin comonomers, such as $C_3$ to $C_{10}$ alpha olefins. In particular, 1-butene and 1-hexene monomers are often used as comonomers with ethylene. Typically, the comonomer will be present in amounts of about 10% by weight of polymer or less, with about 5% by weight or less being more typical. Unless otherwise specified, all composition percentages and ppm values presented herein are by weight based on the total weight of polymer.

The molecular weight distribution or MWD of the polyethylene resin may vary. The MWD can be graphically represented by means of the distribution curve obtained by gel permeation chromatography. The MWD is generally described by what is known as the polydispersity index (D), which represents the ratio between the weight-average molecular weight and the number-average molecular weight ($M_w/M_n$), as defined by standard and well known gel permeation chromatography (GPC) or size exclusion chromatography (SEC) methods. The present invention may have application to polyethylene film resins having polydispersities that can range from about 2 to over 30, with particular application to resins having a polydispersity of from 2 to about 10, or from 2 to about 7. Resins with a narrower molecular weight distribution, i.e. for example a MWD less than about 7, typically have higher clarity, higher gloss, and less haze. Because resins of lower polydispersities have higher clarity, the invention may be particularly well suited to such resins.

The melt flow index of the polyethylene resins used may vary widely. For blown film resins, MI2 melt flows (MI using 2.16 kg-ASTM D1238) of from about 0.05 to about 5 grams/10 min or decigrams/minute (dg/min), or greater, are typically used, with from 0.5 dg/min to 3 dg/min being more typical.

The densities of the polyethylene resins may range from 0.915 g/cm³ to 0.965 g/cm³, all of which may be used for blown film applications. Unless otherwise stated, density measurements presented herein were measured according to ASTM D 792. The selected density may depend upon the application needs for stiffness, optics, permeability, printability, and other properties.

Polyethylene blown films typically have a thickness of from about 0.25 mil (1 mil=0.001 inch) to about 5 mils, with from 0.5 to 3 mils being more typical, and from 1 to 2 mils being still more typical.

By adjusting the rheological breadth, changes in the optical properties of polyethylene films can be made. This can be accomplished without significantly affecting the MWD of the polymer. The optical changes include changes in clarity or haze of the films, as well as gloss. Additionally, changes in barrier properties of the resin have been observed. With respect to the optical properties, increasing the rheological breadth or decreasing the rheological breadth parameter results in an increase in haze and a decrease in gloss. Increasing the rheological breadth means that the Carreau-Yasuda parameter "a" has a smaller value. It has been observed that a decrease in the rheological breadth parameter results in an increase in haze, which can be perceived with the naked eye. This can be by as much as 10% or more, with an increase of 20% or more being readily obtainable.

Adjusting the rheological breadth can be carried out in a number of ways. Typically, it is adjusted by adding a free-radical initiator to the resin during compounding or extrusion. As used herein, a free radical initiator is that which results in a small amount of cross linking or forming branches of polyethylene molecules. Chemical free-radical initiators may include peroxides, oxygen or an oxygen-containing gas (such as air), and azides, such as diazido esters of dicarboxylic acids. Radiation may also be used as a free radical initiator. Additionally, subjecting the polymer to shear stresses, such as encountered during extrusion, can also result in long chain branching of the polyethylene resin. In such cases, however, multiple extrusion passes may be required for significant long chain branching of the resin to occur.

Desirable free radical initiators are peroxides, particularly the organic peroxides. Two classes of organic peroxides have been found to be particularly suitable. These are the dialkyl and peroxyketal type peroxides. An example of a commercially available dialkyl peroxide for use as a free radical initiator is 2,5-dimethyl-2,5-di(t-butylperoxy) hexane, available as LUPERSOL® 101, from Atofina Chemicals, Inc. Two commercially available peroxyketal peroxides are LUPERSOL® 233 and 533, which are examples of t-butyl and t-amyl type peroxides, respectively, and are also available from Atofina Chemicals, Inc. The choice of peroxide may vary, however, depending upon the particular application and extruder temperatures encountered.

Typical extruder temperatures in forming polyethylene blown films are from about 350° F. to about 550° F., more typically with extruder temperatures of about 350° F. to 475° F. The extruder temperature or polyethylene melt is usually above the decomposition temperature of the peroxide. Thus, extruder temperatures will typically be at least 5% or higher than the decomposition temperature of the peroxide being used to ensure its complete decomposition.

The peroxide can be added to the polyethylene fluff or powder prior to introduction into the extruder. When added to the fluff, the peroxide should be thoroughly mixed or dispersed throughout the polymer before being introduced into the extruder. Alternatively, the peroxide can be injected into the polyethylene melt within the extruder. The peroxide is usually added as a liquid, although the peroxide may be added in other forms as well, such as a peroxide coated solid delivery. The peroxide may also be added or combined with the polyethylene prior to or after the polyethylene is fed into the extruder. It is preferable to add liquid peroxide to the melt phase of the polyethylene within the extruder to ensure that the peroxide is completely dispersed. The peroxide may be introduced into the extruder through any means known to those skilled in the art, such as by means of a gear pump or other delivery device. If oxygen or air is used as the initiator, these are preferable injected into the extruder within the polyethylene melt.

The amount of peroxide or initiator necessary to achieve the desired properties and processability may vary. Typically, for peroxides, the amounts used are from about 5 to about 100 ppm, with from about 5 to 50 ppm being more typical. For many applications, a range for peroxide is that from about 5 to about 40 ppm is suitable.

The following examples serve to further illustrate the invention.

EXAMPLES

Example 1

A Ziegler-Natta-catalyzed polyethylene resin having a hexene comonomer content of less than 0.1 mole %, a polydispersity of less than 5.0, an initial fluff MI2 of 1.2 dg/10 min, and a density of 0.959 g/cm$^3$ to 0.961 g/cm$^3$ was used. The polyethylene resin was compounded using the following additives:

600 ppm Viton GB 800 ppm Irganox 1010

400 ppm Ultranox 627A

In order to minimize oxidative reactions in the melt, the openings of the extruder were sealed off and the fluff was kept under constant nitrogen purge. The polymer fluff, along with the additives, were gravity feed from a hopper and compounded on a Leistritz ZSE 50 twin-screw extruder. Lupersol® 101 was added in an amount of 30 ppm to one of the samples (Sample 1) and compounded at 175 rpm. Additionally, samples without peroxide were compounded at two different speeds (Sample 2=175 rpm and Sample 3=300 rpm). For samples compounded at 175 rpm, the melt temperature ranged from 458° F. to 460° F., with a throughput of 2.2 lbs/min. For the sample compounded at 300 ppm, the melt temperature was 476° F., with a throughput of 3.8 lbs/min.

After compounding, the polymer was processed to form blown films of varying thicknesses on an industrial-scale line. The film line utilized a grooved feedthroat extruder with a single lip air ring, with a blower and chiller run at 40° F., attached to the die. Films were taken up on a variable speed winder. All films were made with no neck and were stable at all test conditions. Three thicknesses of films were made at 0.5 mils, 1.0 mils and 2.0 mils. Two sets of processing temperatures were used as well. Table 1 sets for the blown film line processing conditions.

TABLE 1

| Temperature Profile | High Temperature | Low Temperature |
| --- | --- | --- |
| Die Gap. (mm) | 0.9 | 0.9 |
| Neck Height (in) | 0 | 0 |
| Layflat (in) | 22 | 22 |

TABLE 1-continued

| Temperature Profile | High Temperature | Low Temperature |
| --- | --- | --- |
| Blow Up Ratio | 3 | 3 |
| Film Thickness (mils) | 0.5, 1, 2 | 1 |
| Take Away (m/min) | 80, 40, 20 | 40 |
| Extruder RPM | 100 | 100 |
| Zone 1 (° F.) | 375 | 335 |
| Zone 2 (° F.) | 390 | 340 |
| Zone 3 (° F.) | 400 | 341 |
| Die 1 (° F.) | 400 | 340 |
| Die 2 (° F.) | 400 | 340 |
| Die 3 (° F.) | 400 | 340 |

Average molecular weight data, as measured by GPC, for Samples 1–3 are presented in Table 2 below.

TABLE 2

| Sample | Mn | Mw | Mz | D = Mw/Mn |
| --- | --- | --- | --- | --- |
| 1 | 19528 | 87369 | 356403 | 4.47 |
| 2 | 21370 | 103050 | 447794 | 4.82 |
| 3 | 22996 | 104494 | 455906 | 4.54 |

Carreau-Yasuda rheological parameters and flow activation energy for the samples are presented in Table 3.

TABLE 3

| Sample | Zero Shear Viscosity "$\eta_o$" (Pa sec) | Relaxation Time "$\lambda$" (sec) | Breadth Parameter "a" | Power Law Index "n" | Flow Activation Energy "$E_a$"(kJ/mol) |
| --- | --- | --- | --- | --- | --- |
| 1 | 1.47E + 04 | 6.170E − 03 | 0.285 | 0 | 28.00 |
| 2 | 1.11E + 04 | 6.777E − 03 | 0.324 | 0 | 27.98 |
| 3 | 1.27E + 04 | 6.324E − 03 | 0.306 | 0 | 27.93 |

It is apparent when comparing samples 2 and 3, both of which used the same additives package, that increasing screw speed from 175 rpm to 300 rpm resulted in a decrease in the rheological breadth parameter "a". Furthermore, a significant decrease in this parameter resulted from the addition of the free radical initiator—Lupersol® 101, i.e. Sample 1. This is consistent with increased rheological breadth corresponding to increases in long chain branching. The higher vis-breaking that occurs through vigorous compounding at higher rpm's and the addition of a peroxide both promote long chain branching.

Table 4 lists haze, gloss and water vapor transmission rates (WVTR) of 1 mil films produced with resins of Samples 1 and 2 formed at melt temperature of about 410° F. Haze values were measured according to ASTM D1003, procedure "A", gloss according to ASTM D253, and MVTR according to ASTM D3985.

TABLE 4

| Sample | Haze % | Gloss (45°) | MVTR (g/100 in$^2$/day) |
| --- | --- | --- | --- |
| 1 | 18.2 | 43.8 | 0.51 |
| 2 | 16.1 | 48.4 | 0.47 |

From the above data for Samples 1 and 2, it can be seen that Sample 1 had an increased rheological breadth (i.e. decreased breadth parameter "a"), higher haze and lower gloss. Specifically, decreasing the breadth parameter "a" from 0.324 to 0.285, or approximately 12%, resulted in an increase of haze from 16.1% to 18.2%, an increase of about 13%. Additionally, gloss was decreased from 48.4 to 43.8, or about 9.5%.

Example 2

Plant-compounded polyethylene, compounded similarly to the lab-scale samples of Example 1, having a polydispersity of approximately 4.7 and a rheological breadth of 0.339 were prepared and formed into 1 mil blown films using the same film line and similar conditions as in Example 1. The films made from this resin exhibited a haze of 14.5% and a gloss of 49.5%, which is consistent with the trends seen in the two lab-scale samples of Example 1.

Example 3

Different polyethylene resins using different peroxide additives and multipass extrusions, both of which promote the formation of long chain branching, were evaluated. Table 5 details the resin base properties for Samples 4–6.

TABLE 5*

| Sample | 4 | 5 | 6 |
|---|---|---|---|
| Typical Fluff MI2.16 (dg/min) | — | 0.35 | 1.2 |
| Typical Fluff MI5 (dg/min) | 2.0 | — | — |
| Typical Pellet MI2.16 (dg/min) | 0.55 | 0.28 | 1.2 |
| Typical Pellet MI5 (dg/min) | 1.90 | 1.10 | — |
| Typical Pellet MI21.6 (dg/min) | 19.0 | 20.0 | 33.0 |
| Density Target (g/cc) | 0.945 | 0.937 | 0.961 |
| Comonomer | Butene | Hexene | Hexene |
| Comonomer (wt %)** | 0.88–1.2 | 1.0–1.5 | 0–0.2 |
| Polydispersity (Mw/Mn) | 6.59 | 11.82 | 4.77 |
| Mn | 22452 | 16942 | 23423 |
| Mw | 148035 | 200166 | 111731 |
| Mz | 943653 | 2093994 | 522920 |
| Additives | | | |
| Calcium Stearate (ppm) | 3428 | 0 | 0 |
| Irgafos 168 | 1075 | 704 | 0 |
| Irganox | 0 | 302 | 597 |
| PEROXIDE | 0 | 0 | 1–100 |
| Catalyst Type | Z-N | Chrome | Z-N |

*Dashed lines indicate no data available.
**Approximate ranges.

Samples 4–6 were compounded on a Brabender twin screw extruder (Type 15-02-000). In samples 4 and 5, long chain branching was promoted by repeated extrusion passes or multipass extrusion. The same increase in long chain branching resulted without added peroxide or another free initiator. Therefore the multipass extrusion data are equivalent to results that would be produced with the addition of peroxide. The Brabender twin screw extruder was run at a screw speed of 40 RPM and extruder zone temperatures set at 230° C.

For Samples 6 (6a–6e), the polymer was compounded with various additive packages, as listed in Table 6 below, with increasing levels of peroxide to promote increasing amounts of long chain branching. The compounding was performed with zone temperatures set at 190° C. The polymer was exposed to air without nitrogen purging.

Film blowing was accomplished using a Brabender mini film line having an annular die of 0.9 mm and a die diameter of 5.97 cm. Screw speed was 80 rpm to provide a throughput of about 30 to 36 g/min. Take up winder speed was set to provide a linear speed of 12.5 m/min and a film thickness of 0.5 mils. In some cases, for Sample 6, the speed was cut in half to provide a film thickness of 1 mil. A blow ratio of 4 was used to make all films. Die temperatures were set at 200 or 215° C. The film was processed at a low neck height of 0 to 2 inches.

TABLE 6

| Additives for Sample 6 | Irganox 1010 (ppm) | Ultranox 627A (ppm) | Viton GB (ppm) | Lupersol 101 (ppm) |
|---|---|---|---|---|
| 6a | 800 | 400 | 600 | 0 |
| 6b | 400 | 200 | 600 | 0 |
| 6c | 400 | 200 | 600 | 25 |
| 6d | 400 | 200 | 600 | 50 |
| 6e | 400 | 200 | 600 | 100 |

The Carreau-Yasuda rheological parameters and flow activation energy for Samples 4–6 are shown in Table 7 below.

TABLE 7*

| Sample | Extruder Pass | Zero Shear Viscosity "$\eta_o$" (Pa sec) | Relaxation Time "$\lambda$" (sec) | Breadth Parameter "a" | Power Law Index "n" | Flow Activation Energy "$E_a$"(kJ/mol) |
|---|---|---|---|---|---|---|
| 4 | — | 4.68E + 04 | 1.245E − 02 | 0.233 | 0 | 28.47 |
| 4 | 1st | 1.10E + 05 | 1.300E − 02 | 0.182 | 0 | 29.39 |
| 4 | 2nd | 1.02E + 07 | 4.300E − 02 | 0.093 | 0 | 30.57 |
| 4 | 3rd | 4.22E + 08 | 3.020E − 01 | 0.069 | 0 | 30.47 |
| 4 | 4th | 5.66E + 07 | 1.890E − 01 | 0.081 | 0 | 37.45 |
| 5 | — | 6.84E + 05 | 9.06E − 02 | 0.144 | 0 | 32.05 |
| 5 | 1st | 6.21E + 05 | 8.26E − 02 | 0.146 | 0 | 33.40 |
| 5 | 2nd | 2.97E + 07 | 3.85E − 02 | 0.091 | 0 | 33.17 |
| 5 | 3rd | 3.95E + 07 | 5.91E − 01 | 0.091 | 0 | 30.90 |
| 5 | 4th | 1.63E + 10 | 2.86E + 01 | 0.060 | 0 | 35.56 |
| 6a | — | 9.94E + 03 | 6.445E − 03 | 0.338 | 0 | 26.24 |
| 6b | — | 1.08E + 04 | 6.711E − 03 | 0.339 | 0 | 28.26 |
| 6c | — | 4.13E + 04 | 4.819E − 03 | 0.195 | 0 | 27.76 |
| 6d | — | 7.61E + 04 | 4.504E − 03 | 0.171 | 0 | 29.17 |
| 6e | — | 3.50E + 05 | 7.004E − 03 | 0.140 | 0 | 29.66 |

*Dashed line indicates no additional extruder pass.

The result of degradation and changes in the rheological breadth, i.e. the parameter "a", on film clarity in 0.5 mil blown films for resin samples 4–6 is in Table 8 below, and graphically illustrated in FIG. 1.

TABLE 8*

| Sample | Extruder Pass | Mean Clarity (%) | Rheological Breadth "a" |
|---|---|---|---|
| 4 | — | 23.76 | 0.233 |
| 4 | — | 24.25 | 0.233 |
| 4 | — | 24.08 | 0.233 |
| 4 | 1st | 22.08 | 0.182 |
| 4 | 2nd | 15.49 | 0.093 |
| 4 | 3rd | 12.93 | 0.069 |
| 4 | 4th | 14.28 | 0.081 |
| 5 | — | 20.94 | 0.144 |
| 5 | — | 21.65 | 0.144 |
| 5 | 1st | 23.12 | 0.146 |
| 5 | 2nd | 13.80 | 0.091 |
| 5 | 3rd | 8.98 | 0.091 |
| 5 | 4th | 5.68 | 0.060 |
| 6a | — | 32.48 | 0.338 |
| 6b | — | 32.32 | 0.339 |
| 6c | — | 23.56 | 0.195 |
| 6d | — | 22.22 | 0.171 |
| 6e | — | 21.53 | 0.130 |

*Dashed line indicates no additional extruder pass.

Despite all the molecular differences, when the resins have the same rheological breadth, they generally exhibit the same clarity. This is despite differences in MWD, catalyst used, and other polymer properties. From the above data, at a rheological breadth "a" of about 0.150, all three polymers had approximately the same mean clarity of about 21% to 23%.

Example 4

Several Ziegler-Natta-based polyethylene resin samples (Samples 7–12) of ethylene homopolymer and ethylene-butene copolymer of different densities were compared. All resins were unimodal resins having fairly narrow molecular weights, with polydispersities ranging from about 5 to about 6.5. Both polyethylene homopolymers and copolymers, with butene as the comonomer were used. Table 9 sets forth the properties of the different resins evaluated.

Samples 7–8 were compounded on a 2½" Welex single screw extruder, with a nitrogen purge on the fluff. All temperatures were set at 450° F. to 475° F. The throughput was approximately 190 lbs/hr at a screw speed of 100 RPM. Samples 9–12 were compounded using a Leistritz ZSE 50 twin screw extruder. A nitrogen purge was used in the hopper. Most temperatures were set at 430° F. to 460° F., with the first two zone temperatures set slightly lower because of their proximity to the feed throat. The throughput was 130 lbs/hr. Film blowing of all samples was accomplished using a Brabender mini film line having an annular die of 0.9 mm and a die diameter of 5.97 cm. Screw speed was 80 rpm to provide a throughput of about 30 to 36 g/min. Take up winder speed was set to provide a linear speed of 12.5 m/min and a film thickness of 0.5 mils. A blow ratio of 4 was used to make all films. Die temperatures were set at 200 or 215° C. The film was processed at a low neck height of 0 to 2 inches.

The Carreau-Yasuda rheological parameters and flow activation energy for Samples 7–12 are shown in Table 10 below.

TABLE 10

| Sample | Zero Shear Viscosity "$\eta_o$" (Pa sec) | Relaxation Time "$\lambda$" (sec) | Breadth Parameter "a" | Power Law Index "n" | Flow Activation Energy "$E_a$"(kJ/mol) |
|---|---|---|---|---|---|
| 7 | 1.60E + 04 | 7.659E − 03 | 0.287 | 0 | 28.56 |
| 8 | 1.63E + 04 | 7.026E − 03 | 0.291 | 0 | 28.17 |
| 9 | 2.70E + 04 | 8.355E − 03 | 0.249 | 0 | 28.09 |
| 10 | 1.78E + 04 | 6.705E − 03 | 0.271 | 0 | 27.99 |
| 11 | 1.85E + 04 | 6.922E − 03 | 0.262 | 0 | 27.67 |
| 12 | 1.73E + 04 | 6.815E − 03 | 0.275 | 0 | 29.20 |

Film clarity for 0.5 mil blown film samples produced from the resin samples 7–12 and the rheogical breadth data are presented in Table 11 below. The relationship between film clarity and the rheological breadth is evident. Increases in rheological breadth (smaller "a" values) generally makes a film less clear. These results are consistent with the prior examples. Because a free radical initiator causes rheological breadth to increase, using a free radical initiator with these polymers would cause an increase in rheological breath and a corresponding decrease in film clarity.

TABLE 9*

| Sample | 7 | 8 | 9 | 10 | 11 | 12 |
|---|---|---|---|---|---|---|
| Fluff MI2 (dg/10 min) | 1.21 | 1.19 | 1.21 | 1.3 | 1.2 | 1.18 |
| Pellet MI2 (dg/10 min) | 0.99 | 1.0 | — | — | — | — |
| Fluff Density (g/cc) | 0.9476 | 0.9473 | 0.9468 | 0.9455 | 0.9429 | 0.9354 |
| Pellet Density (g/cc) | 0.9487 | 0.9490 | — | — | — | — |
| Butene Comonomer (wt. %)** | 0.8–1.2 | 0.8–1.2 | 0.8–1.2 | 0.8–1.2 | 0.8–1.2 | 0.8–1.2 |
| Polydispersity (Mw/Mn) | 6.5 | 6.6 | 6.0 | 6.5 | 6.4 | 5.3 |
| Mn | 19971 | 21096 | 20511 | 19358 | 21002 | 21786 |
| Mw | 125736 | 139106 | 123341 | 124978 | 134840 | 116204 |
| Mz | 726410 | 764518 | 627518 | 737165 | 1002188 | 567005 |
| Additives (ppm) | | | | | | |
| Viton GB | 600 | 600 | 600 | 600 | 600 | 600 |
| Irgafos 168 | 800 | 800 | 800 | 800 | 800 | 800 |
| Irganox 1010 | 400 | 400 | 400 | 400 | 400 | 400 |
| PEROXIDE | 0 | 0 | 0 | 0 | 0 | 0 |

*Dashed line indicates no data available.
**Approximate ranges.

TABLE 11

| Sample | Mean Clarity (%) | Rheological Breadth "a" |
|---|---|---|
| 7 | 41.43 | 0.287 |
| 8 | 39.83 | 0.291 |
| 9 | 34.80 | 0.249 |
| 10 | 35.63 | 0.271 |
| 11 | 37.31 | 0.262 |
| 12 | 40.06 | 0.275 |

Example 5

To determine if certain resins could be modified to increase rheological breadth (decrease "a" parameter) and lower clarity and to predict the rheological breadth of a resin based on clarity, and vice versa, several chromium-catalyzed resins were tested and predicted values were determined. Samples 13–20 were tested. The resins were plant produced polyethylene blow molding grade resins. Some samples used peroxide to increase rheological breadth. Table 12 sets forth the properties of the resins of Samples 13–20.

TABLE 12*

| Sample | 13 | 14 | 15 | 16 | 17 | 18 | 19 | 20 |
|---|---|---|---|---|---|---|---|---|
| Pellet MI2 (dg/min) | 0.26 | 0.33 | 0.37 | 0.23 | 0.32 | 0.37 | 0.31 | 0.37 |
| Pellet MI5 (dg/min) | 1.08 | 1.41 | 1.63 | 1.43 | 1.6 | 1.63 | 1.3 | 1.63 |
| Pellet MI21.6 (dg/min) | 28.1 | 27.32 | 31.5 | 28.5 | 36.9 | 31.5 | 30.2 | 31.5 |
| Density (g/cc) | 0.9543 | 0.9551 | 0.9546 | 0.9543 | 0.9546 | 0.9546 | 0.9545 | 0.9546 |
| Hexene Comonomer (wt. %)** | 0.3–0.5 | 0.3–0.5 | 0.3–0.5 | 0.3–0.5 | 0.3–0.5 | 0.3–0.5 | 0.3–0.5 | 0.3–0.5 |
| Polydispersity (Mw/Mn) | — | 7.1 | 6.7 | — | — | — | — | — |
| Mn | — | 17573 | 18047 | — | — | — | — | — |
| Mw | — | 124319 | 121251 | — | — | — | — | — |
| Mz | — | 971896 | 974555 | — | — | — | — | — |
| Additives (ppm) | | | | | | | | |
| Irganox 1076 Target | 450 | 450 | 450 | 450 | 450 | 450 | 450 | 450 |
| Peroxide Target | 30 | 0 | 0 | 30 | 30 | 0 | 30 | 0 |

*Dashed line indicates no data available.
**Approximate ranges.

Film blowing of all samples was accomplished using a Brabender mini film line having an annular die of 0.9 mm and a die diameter of 5.97 cm. Screw speed was 80 rpm to provide a throughput of about 30 to 36 g/min. Take up winder speed was set to provide a linear speed of 12.5 m/min and a film thickness of 0.5 mils. A blow ratio of 4 was used to make all films. Die temperatures were set at 200 or 215° C. The film was processed at a low neck height of 0 to 2 inches.

Carreau-Yasuda rheological parameters and flow activation energy, and clarity of films was determined and is presented in Tables 13 and 14 below. Additionally, rheological breadths were predicted for the polymers using a quadratic equation below. The quadratic equation was determined using the mean clarity versus rheological breadth (a) of Samples 13–20 and is presented below.

$$a = 3.533 \times 10^{-4} x^2 - 3.146 \times 10^{-3} x + 0.06647 \quad (4)$$

TABLE 13

| Sample | Zero Shear Viscosity "$\eta_o$" (Pa sec) | Relaxation Time "$\lambda$" (sec) | Breadth Parameter "a" | Power Law Index "n" | Flow Activation Energy "$E_a$"(kJ/mol) |
|---|---|---|---|---|---|
| 13 | 4.34E + 08 | 0.803 | 0.067 | 0 | 35.55 |
| 14 | 6.24E + 06 | 0.127 | 0.098 | 0 | 31.63 |
| 15, 18, 20 | 7.08E + 06 | 0.121 | 0.096 | 0 | 33.77 |
| 16 | 2.28E + 08 | 0.489 | 0.069 | 0 | 28.09 |
| 17 | 5.36E + 08 | 0.571 | 0.065 | 0 | 33.42 |
| 19 | 3.56E + 08 | 0.519 | 0.067 | 0 | 23.13 |

TABLE 14

| Sample | Mean Clarity (%) | Error Mean Clarity | Rheological Breadth "a" | Predicted Rheological Breadth "a" |
|---|---|---|---|---|
| 13 | 9.43 | 0.15 | 0.067 | 0.068 |
| 14 | 13.96 | 0.08 | 0.098 | 0.091 |
| 15 | 15.25 | 0.16 | 0.096 | 0.085 |
| 16 | 15.42 | 0.10 | 0.069 | 0.069 |
| 17 | 14.86 | 0.06 | 0.065 | 0.070 |
| 18 | 16.32 | 0.05 | 0.096 | 0.085 |
| 19 | 11.12 | 0.05 | 0.067 | 0.069 |
| 20 | 22.70 | 0.20 | 0.096 | 0.085 |

The predicted rheological breadth was within the margin for error for the mean clarity values and were very close to the experimental values. Using the quadratic equation 4, clarity values could also be similarly predicted based upon rheological breadth. The rheological breadth can thus provide an effective estimate of film clarity, and vice versa.

Figure 2:
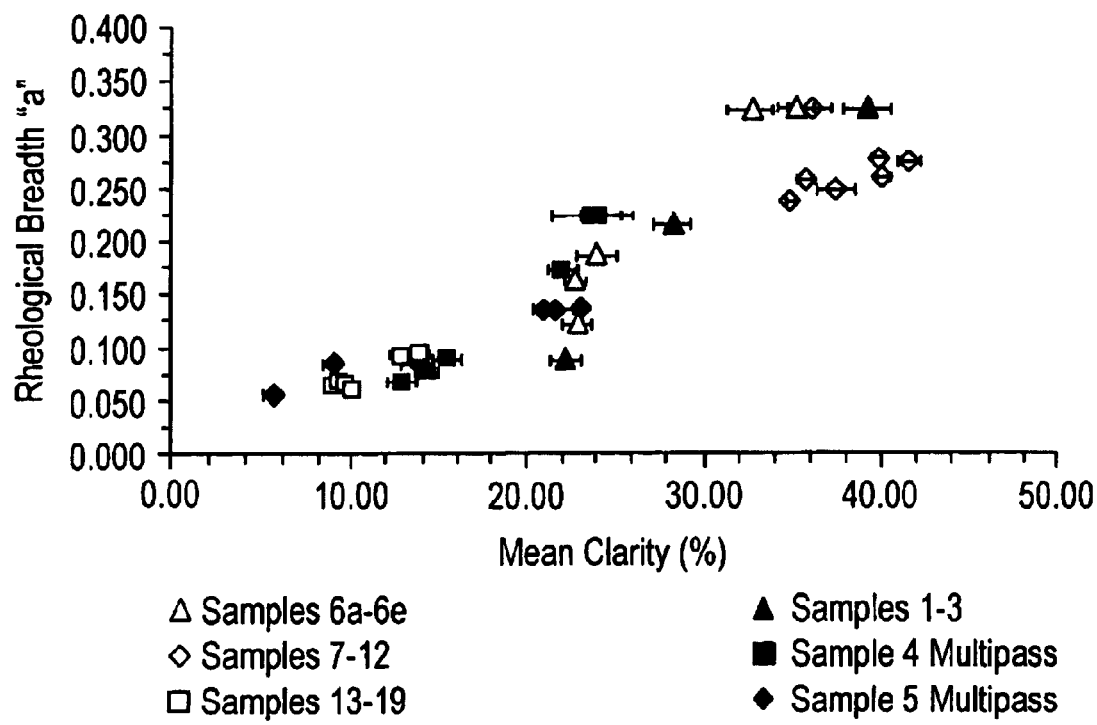
FIG. 2 is a plot showing the relationship of rheological breadth versus film clarity for polyethylene resin Samples 1–20.

FIG. 2 represents the rheological breadth, i.e. the parameter "a", on film clarity in 0.5 mil blown films for resin samples evaluated, i.e. Samples 1–20. As can be seen, there is a clear relationship between clarity and rheological breadth for different polyethylene resins that can be used for predicting and adjusting properties of the resin.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A method of modifying a polyethylene material for use in making blown films comprising; providing a polyethylene resin; determining the initial rheological breadth of the polyethylene resin; and modifying the resin to adjust the rheological breadth of the polyethylene from the initial rheological breadth to a different rheological breadth that corresponds to a desired film property.

2. The method of claim 1, wherein: the polyethylene has a polydispersity (Mw/Mn), and wherein modifying the resin includes adjusting the rheological breadth of the polyethylene while substantially maintaining the polydispersity of the polyethylene resin.

3. The method of claim 1, wherein: the polyethylene resin is modified by the addition of a free radical initiator to the resin.

4. The method of claim 1, wherein: the desired resin property is an optical property.

5. The method of claim 1, wherein: modifying the resin includes decreasing the rheological breadth.

6. The method of claim 1, wherein: the polyethylene resin has a polydispersity (Mw/Mn) of about 2 or more.

7. The method of claim 1, wherein: the desired film property is clarity.

8. The method of claim 1, wherein the polyethylene resin is modified by the addition of a chemical free radical initiator to the resin.

9. The method of claim 8, wherein: the free radical initiator is selected from a group consisting of peroxides, oxygen, and azides.

10. The method of claim 1, wherein: the polyethylene resin has a polydispersity (Mw/Mn) of less than about 10.

11. A method of modifying a polyethylene material for use in making blown films to change haze properties of the material, the method comprising providing a polyethylene resin and modifying the resin to adjust the theological breadth of the resin so that the modified resin exhibits a haze that is different than that of the unmodified resin when formed into a film or sheet.

12. The method of claim 11, wherein: the polyethylene resin has a polydispersity (Mw/Mn) of less than about 10.

13. The method of claim 11, wherein: the resin is modified by the addition of a free-radical initiator.

14. The method of claim 11, wherein: the resin is modified to increase the rheological breadth, and wherein the modified resin exhibits haze that is greater than that of the unmodified resin when firmed into a film or sheet.

15. The method of claim 14, wherein: the haze of the modified resin is at least 20% greater than that of the unmodified resin.

16. The method of claim 11, wherein: the resin has a polydispersity of about 2 or more.

17. A method for predicting haze properties in a polyethylene resin material for use in making blown films comprising: determining the theological breadth of a polyethylene resin of interest; providing a polyethylene resin template of measured rheological breadths having corresponding measured haze properties; matching the rheological breadth of the polyethylene resin of interest to a corresponding rheological breadth from the polyethylene resin template; and determining the corresponding measured haze properties from the polyethylene resin template.

18. A method for predicting rheological breadth properties in a polyethylene resin material for use in making blown films comprising: determining the clarity of a polyethylene resin; providing a polyethylene resin template of measured clarity having corresponding measured theological breadth properties; matching the clarity of the polyethylene resin of interest to a corresponding clarity from the polyethylene resin template; and determining the corresponding measured rheological breadth properties from the polyethylene resin template.

* * * * *